(12) United States Patent
Grcevski et al.

(10) Patent No.: US 7,698,697 B2
(45) Date of Patent: Apr. 13, 2010

(54) TRANSFORMING CODE TO EXPOSE GLACIAL CONSTANTS TO A COMPILER

(75) Inventors: Nikola Grcevski, Toronto (CA); Mark Graham Stoodley, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 11/071,026

(22) Filed: Mar. 3, 2005

(65) Prior Publication Data

US 2006/0200809 A1    Sep. 7, 2006

(51) Int. Cl.
   *G06F 9/45* (2006.01)
(52) U.S. Cl. ...................................................... 717/151
(58) Field of Classification Search ......... 717/106–108, 717/140–153
   See application file for complete search history.

(56) References Cited

U.S. PATENT DOCUMENTS

| | | | |
|---|---|---|---|
| 5,481,706 A | | 1/1996 | Peek |
| 5,923,880 A | | 7/1999 | Rose et al. |
| 6,139,198 A | * | 10/2000 | Danforth et al. ............ 717/128 |
| 6,324,686 B1 | | 11/2001 | Komatsu et al. |
| 6,427,234 B1 | | 7/2002 | Chambers et al. |
| 6,694,507 B2 | | 2/2004 | Arnold et al. |
| 6,704,862 B1 | | 3/2004 | Chaudhry et al. |
| 6,738,778 B1 | | 5/2004 | Williamson et al. |
| 6,738,965 B1 | | 5/2004 | Webster |
| 2002/0073063 A1 | | 6/2002 | Faraj |
| 2003/0070161 A1 | * | 4/2003 | Wong et al. .................. 717/148 |
| 2003/0086620 A1 | | 5/2003 | Lucco |
| 2003/0159133 A1 | | 8/2003 | Ferri et al. |
| 2004/0068716 A1 | | 4/2004 | Stevens |
| 2004/0078691 A1 | | 4/2004 | Cirne et al. |
| 2004/0103404 A1 | | 5/2004 | Naumovich et al. |

OTHER PUBLICATIONS

Frank Tip and Peter F. Sweeney, "Class Hierarchy Specialization", 1997 ACM, pp. 271-281.*
David Evans, "Lecture 12: Subtyping and Inheritance", University of Virginia, Oct. 2003; retrieved from "http://www.cs.virginia.edu/cs201j/lectures/lecture12.ppt/" on Oct. 8, 2007.*

(Continued)

*Primary Examiner*—Ted T Vo
(74) *Attorney, Agent, or Firm*—Marcia L. Doubet

(57) ABSTRACT

Techniques for causing a compiler to organize code pertaining to data that is not constant, but that is unlikely to change except in relatively infrequent situations, in an improved manner. A class containing data that may have more than one value, but which will have a particular value in the typical case, is now split into two parts, a first class which uses the more-likely data value as a constant, and a second class (designed as a subclass of the first class) that uses the data value as a variable capable of having either the more-likely value or other, less-likely values. The compiler generates assembly code comprising instructions pertaining to the more-likely data value, and also generates assembly code capable of processing the less-likely data values. This latter code, however, is initially unreachable. The compiler-generated assembly code will be programmatically patched, at run time, if any of the less-likely data values occur, thereby dynamically making the code reachable. Once the initially-unreachable code becomes reachable, it will be used thereafter (regardless of the setting of the data value).

32 Claims, 10 Drawing Sheets

```
500 class Tracer {
510    public boolean enabled()       { return false; }

520    public void trace(String s)    {};
    };
```

OTHER PUBLICATIONS

Peter F. Sweeney and Frank Tip, "Extracting Library-Based Object-Oriented Applications", 2000 ACM, pp. 98-107.*

Calder et al. "Value Profiling and Optimization", 1999, Journal of Instruction-Level Parallelism, pp. 1-37.*

Autrey and Wolfe, "Initial Results for Glacial Variables Analysis", 1998, International Journal of Parallel Programming, vol. 26, No. 1, pp. 43-64.*

Suganuma et al., "A Dynamic Optimization Framework for a Java Just-in-Time Compiler", 2001, ACM, pp. 180-194.*

Whaley, "Dynamic Optimization Through The Use of Automatic Runtime Specialization", May 1999, Master thesis of Department of Electrical Engineering and Computer Science, Massachusetts Institute of Technology, pp. 1-144.*

Robert Muth et al., "Code Specialization Based on Value Profiles", 2000, Springer-Verlag Berlin Heidelberg, pp. 340-361.

Tony Chao, "Jet: An Application of Partial Evaluation in Dynamic Code Generation for Java", May 2000.

* cited by examiner

FIG. 1    PRIOR ART

```
class Tracer {
110    static boolean _tracingEnabled=false;

120    public final boolean enabled()   { return _tracingEnabled; }
130    public void enableTracing()      {_tracingEnabled = true; }
140    public void disableTracing()     {_tracingEnabled = false;
150    public void trace(String s);
                              151
};
```

FIG. 2    PRIOR ART

```
class C {
210    public void Method(int arg) {
220      if (tracer.enabled()) {
230         tracer.trace("Method(" + arg + ") entry");
                            231    232    233
240      // do a bunch of work
250      if (tracer.enabled()) {
260         tracer.trace("Method exit");
                            261    262
         }
};
```

FIG. 3    PRIOR ART

```
class C {
    public void Method(int arg) {
        if (tracer._tracingEnabled)
            tracer.trace("Method(" + arg + ") entry");
        // do a bunch of work
        if (tracer._tracingEnabled) {
            tracer.trace("Method exit");
        }
    }
};
```

```
400
  405  Method:
  410          load    r1, address of tracer object
  415          load    r2, r1+offsetof(_tracingEnabled)
  420          cmp     r2, 0
  425          beq     noEntryTrace
  430          ; code here to call tracer.trace()
  435  noEntryTrace:
  440          ; do a bunch of work
  445          load    r3, address of tracer object
  450          load    r4, r3+offsetof(_tracingEnabled)
  455          cmp     r4, 0
  460          beq     noExitTrace
  465          ; code here to call tracer.trace()
  470  noExitTrace:
  475          return
```

FIG. 5A

```
class Tracer {
510   public boolean enabled()      { return false; }
520   public void trace(String s)   {};
};
```
500

FIG. 5B

```
class FullTracer extends Tracer {
540   public boolean _tracingEnabled=true;
550   public boolean enabled()      { return _tracingEnabled; }
560   public void enableTracing()   { _tracingEnabled = true; }
570   public void disableTracing()  { _tracingEnabled = false; }
580   public void trace(String s);
};
```
531
530

FIG. 6

```
class C {
    public void Method(int arg) {
620     if (tracer.enabled() has not been overridden && false || tracer.enabled()) {    ⎯621
            tracer.trace("Method(" + arg + ") entry");
        }
        // do a bunch of work
650     if (tracer.enabled() has not been overridden && false || tracer.enabled()) {
            tracer.trace("Method exit");
        }
    };
};
```

600

FIG. 7 tracer.enabled() has not been overridden &&

| No-op Location | Assumptions |
|---|---|
| @ Patch1 | no class extends Tracer and overrides enabled() method |
| @ Patch2 | no class extends Tracer and overrides enabled() method |

FIG. 13

```
1310  if (!tracer instanceof FullTracer)
1320      tracer = new FullTracer();
1330  tracer.enableTracing();
```

FIG. 9

```
900
     Method:
905  Patch1:    jump noEntryTrace                ; potential no-op
910  Merge1:
                cmp  r2, 0
                beq  noEntryTrace
                ; code here to call tracer.trace()

915  noEntryTrace:
                ; do a bunch of work

920  Patch2:    jump noExitTrace                 ; potential no-op
925  Merge2:
                cmp  r4, 0
                beq  noExitTrace
                ; code here to call tracer.trace()

930  noExitTrace:
                return

935  Snippet1:
                load r1, address of tracer object
                ; full virtual call to tracer.enabled()
                move     r2, return value
                jump Merge1
940  Snippet2:
                load r3, address of tracer object
                ; full virtual call to tracer.enabled()
                move     r4, return value
                jump Merge2
```

FIG. 11

```
1100
            Method:
1105    Patch1:    nop
1110    noEntryTrace:
1115               ; do a bunch of work 1120    Patch2:    nop
1125    noExitTrace:
1130               return 1135    Merge1:
                   cmp  r2, 0
                   beq  noEntryTrace
                   ; code here to call tracer.trace()
                   jump noEntryTrace 1140    Merge2:
                   cmp  r4, 0
                   beq  noExitTrace
                   ; code here to call tracer.trace()
                   jump noExitTrace 1145    Snippet1:
                   load r1, address of tracer object
                   ; full virtual call to tracer.enabled()
                   move    r2, return value
                   jump Merge1
1150    Snippet2:
                   load r3, address of tracer object
                   ; full virtual call to tracer.enabled()
                   move    r4, return value
                   jump Merge2
```

FIG. 12

```
1200
        Method:
1205    Patch1:     jump Snippet1
1210    noEntryTrace:
1215                ; do a bunch of work 1220    Patch2:     jump Snippet2
1225    noExitTrace:
1230                return 1235    Merge1:
1236                cmp  r2, 0
1237                beq  noEntryTrace
1238                ; code here to call tracer.trace()
1239                jump noEntryTrace 1240    Merge2:
                    cmp  r4, 0
                    beq  noExitTrace
1243                ; code here to call tracer.trace()
                    jump noExitTrace 1245    Snippet1:
1246                load r1, address of tracer object
1247                ; full virtual call to tracer.enabled()
1248                move     r2, return value
1249                jump Merge1
1250    Snippet2:
                    load r3, address of tracer object
1252                ; full virtual call to tracer.enabled()
                    move     r4, return value
                    jump Merge2
```

TRANSFORMING CODE TO EXPOSE GLACIAL CONSTANTS TO A COMPILER

BACKGROUND OF THE INVENTION

1. Field of the Invention

The present invention relates to computer programming, and deals more particularly with techniques for improving how compilers generate code involving data that is not constant, but is unlikely to change except in relatively infrequent situations.

2. Description of the Related Art

When a compiler processes programming language code in an application that tests a variable and then performs different instructions, based on the variable setting, the compiler generates corresponding assembly-language code comprising a number of assembly-language instructions. Typically, this assembly-language code first accesses a memory or storage location to retrieve the variable's current value, and may then load that value into a register. Additional access and load operations may be required if the compared-to value is also variable. The compiler also generates assembly language code to perform the comparison, as well as branching code for transferring the execution path to a different instruction, based on the result of performing the comparison.

A compiler may alter or manipulate the assembly language code it generates in an attempt to optimize aspects of the application, such as its run-time performance. Such compilers are referred to as optimizing compilers, and are known in the art. One example is the Java™ Just-In-Time ("JIT") compiler. ("Java" is a trademark of Sun Microsystems, Inc.)

Modern processors typically include branch-prediction hardware that attempts to improve run-time performance, as is well known in the art. One type of optimization that may be performed by an optimizing compiler pertains to optimizing run-time performance of the variable comparison and branching scenario discussed above. During execution of an application, modern processors typically track the branches in the actively-executing code and use this information in the branch-prediction hardware (which is critical to optimal performance of these modern processors). Processing time can be shortened if the branch-prediction hardware correctly predicts whether or not the branch will be taken and then loads the corresponding instructions and values that will be executed next.

Run-time performance problems may arise when an application contains a number of comparisons and corresponding branching instructions. For each instance thereof, the length of the run-time path (as well as the size of the compiled image) increases due to the compiler-generated assembly language code for accessing, loading, and comparing the variable(s) and for carrying out the branching.

If an application contains a high number of compare-and-branch operations, the processor may be unable to track all the branches in the currently-active executing code, and the branch prediction hardware can be fooled into mispredicting the branches that will be encountered, thus leading to run-time performance degradation.

A common solution to this problem is to use profiling information in a just-in-time compiler to programmatically reorder the blocks of assembly language code, based on a programmatic prediction of which branch is more likely to be taken in response to a comparison operation, so that the processor's default prediction when it sees a branch is likely to be correct. When this approach succeeds, the cost of the mispredictions is avoided. However, this approach is highly dependent on the quality of the profiling information collected. At some levels of compilation, unfortunately, profiling information may not be available; as a result, the programmatic reordering cannot be performed except by using static heuristics which are less effective.

There are some situations where compare-and-branch logic is provided in an application to be compiled, yet a vast majority of run-time behavior exercises a single one of the branches. An example of this is debugging or tracing logic that is provided in an application (or portions thereof). An application developer might include instrumentation in various methods to trace when those methods have been entered and exited, for example, and perhaps to trace values of input parameters thereto. Typically, this instrumentation has semantics of the form "If tracing is enabled, then write information to a file". Accordingly, these instrumented methods will cause the compiler to generate compare-and-branch code. Performance penalties that may result when executing this instrumented code (such as increased path length) have been discussed above. It is unlikely, during any performance-critical run, that tracing will be enabled. Thus, the variable dictating whether tracing is enabled will most often be set to false (or a similar value corresponding to "don't trace"). It is possible, however, that the user could turn on tracing at any time. Because the value could change, the just-in-time compiler is unable to assume that the initial value will remain constant. As a result, even though the compiler might successfully use profiling information and reorder blocks of assembly language code to match the application's actual run-time behavior, inefficiencies remain because the instructions to access and load the variable, compare it to false (or true), and branch on the result must still be executed.

Accordingly, what is needed are techniques that avoid problems of the type described above.

SUMMARY OF THE INVENTION

The present invention defines techniques for communicating to a compiler that a particular value is expected to be constant in the common case, but that it could change, thereby causing the compiler to generate code that performs more efficiently in the common case. Such values that change infrequently are often referred to as "glacial constants". An example of such a value would be a field indicating whether tracing has been enabled: usually tracing is disabled, except if a problem occurs. According to preferred embodiments, a class containing data that operates as a glacial constant is now split into two parts, a first class which uses the more-likely data value as a constant, and a second class (which is a subclass of the first class) that uses the data value as a variable (which may dynamically take either the more-likely value or other, less-likely values). Access to the data value is through a getter-type method. The compiler generates optimized assembly code that executes instructions pertaining to the more-likely data value, and also generates assembly code capable of processing less-likely data values. This latter code, however, is initially unreachable. The compiler-generated assembly code will be programmatically patched, at run time, if any of the less-likely data values occur, thereby dynamically making the code reachable. Once the initially-unreachable code becomes reachable, it will be used thereafter (regardless of the setting of the data value).

In one aspect, the present invention preferably comprises: providing, for a first code component that uses a glacial constant, two code components as replacements for the first code component, the two code components comprising a base code component wherein the glacial constant is used as a constant value and an overriding code component wherein the glacial constant is used as a variable value, the overriding code component overriding at least a portion of code in the base code component.

Preferably, a compiler of the base code component generates code therefor and also generates code capable of invoking the overriding code component such that the generated code for invoking the overriding code component is initially unreachable and is dynamically made to be reachable when the overriding code component is dynamically loaded.

In another aspect, the present invention comprises a base code component that uses a glacial constant as a constant value; an overriding code component wherein the glacial constant is used as a variable value, the overriding code component adapted for overriding at least a portion of code in the base code component; and a compiler of the base code which generates code therefor and which also generates code capable of invoking the overriding code component such that the generated code capable of invoking the overriding code component is initially unreachable.

In yet another aspect, the present invention comprises computer-readable instructions for executing a first code component that uses a glacial constant as a constant value, provided that an overriding code component which overrides at least a portion of code in the first code component and which uses the glacial constant as a variable value has not yet been dynamically loaded; dynamically loading the overriding code component when a value other than the constant value is needed for the glacial constant; and subsequent to the dynamic loading, executing the overriding code component instead of the overridden portion of the first code component, such that the glacial constant is used as the variable value. The computer-readable instructions preferably further comprise instructions for dynamically loading the overriding code component prior to executing code to set the glacial constant to a value other than the constant value. In preferred embodiments of this aspect, computer-readable instructions for invoking the overriding code component are initially unreachable and are dynamically made to be reachable when the overriding code component is dynamically loaded.

In still another aspect, the present invention comprises a system for processing code containing glacial constants, comprising: means for executing a first code component that uses a glacial constant as a constant value, provided that an overriding code component which overrides at least a portion of code in the first code component and which uses the glacial constant as a variable value has not yet been dynamically loaded; means for dynamically loading the overriding code component when a value other than the constant value is needed for the glacial constant; and means for executing the overriding code component, subsequent to the dynamic loading, instead of the overridden portion of the first code component, such that the glacial constant is used as the variable value. Preferably, the system also comprises means for invoking the overriding code component, the means for invoking being initially unreachable and capable of being dynamically patched into a run-time path for the base code component and the overriding code component, thereby becoming reachable when the overriding code component is dynamically loaded.

In these aspects, the overridden portion preferably comprises code that, when executed, returns the constant value of the glacial constant and the overriding code component further comprises code that, when executed, sets the variable value of the glacial constant.

The present invention will now be described with reference to the following drawings, in which like reference numbers denote the same element throughout.

BRIEF DESCRIPTION OF THE DRAWINGS

FIG. 1 provides a sample programming language class that may be used to provide tracing, and FIG. 2 provides a sample method illustrating how an object of this class might be invoked, according to the prior art;

FIG. 3 depicts the sample class and method from FIGS. 1 and 2 after the Java JIT compiler has in-lined the invocations to the tracer.enabled( ) method, and FIG. 4 depicts (in an abstract form) sample assembly language code that may be generated for this class, according to the prior art;

FIGS. 5A and 5B depict sample programming language classes that may be used to replace the sample class in FIG. 1, according to preferred embodiments;

FIG. 6 provides sample programming language code containing virtual guards, and

FIG. 7 shows details of these virtual guards;

FIG. 8 illustrates a run-time structure that may be used to record information pertaining to virtual guards;

FIG. 9 depicts an intermediate step in assembly language code generation, and

FIG. 11 depicts an optimized version thereof, where portions of the assembly language code remain unreachable because tracing is not yet enabled;

FIG. 12 depicts assembly language code that has been programmatically patched, showing how the code of FIG. 11 is changed once tracing is enabled; and FIG. 13 shows programming language code inserted into a method to force an overriding subclass to be dynamically loaded, such that one or more of its overriding methods can be executed.

DESCRIPTION OF PREFERRED EMBODIMENTS

Figure 10:
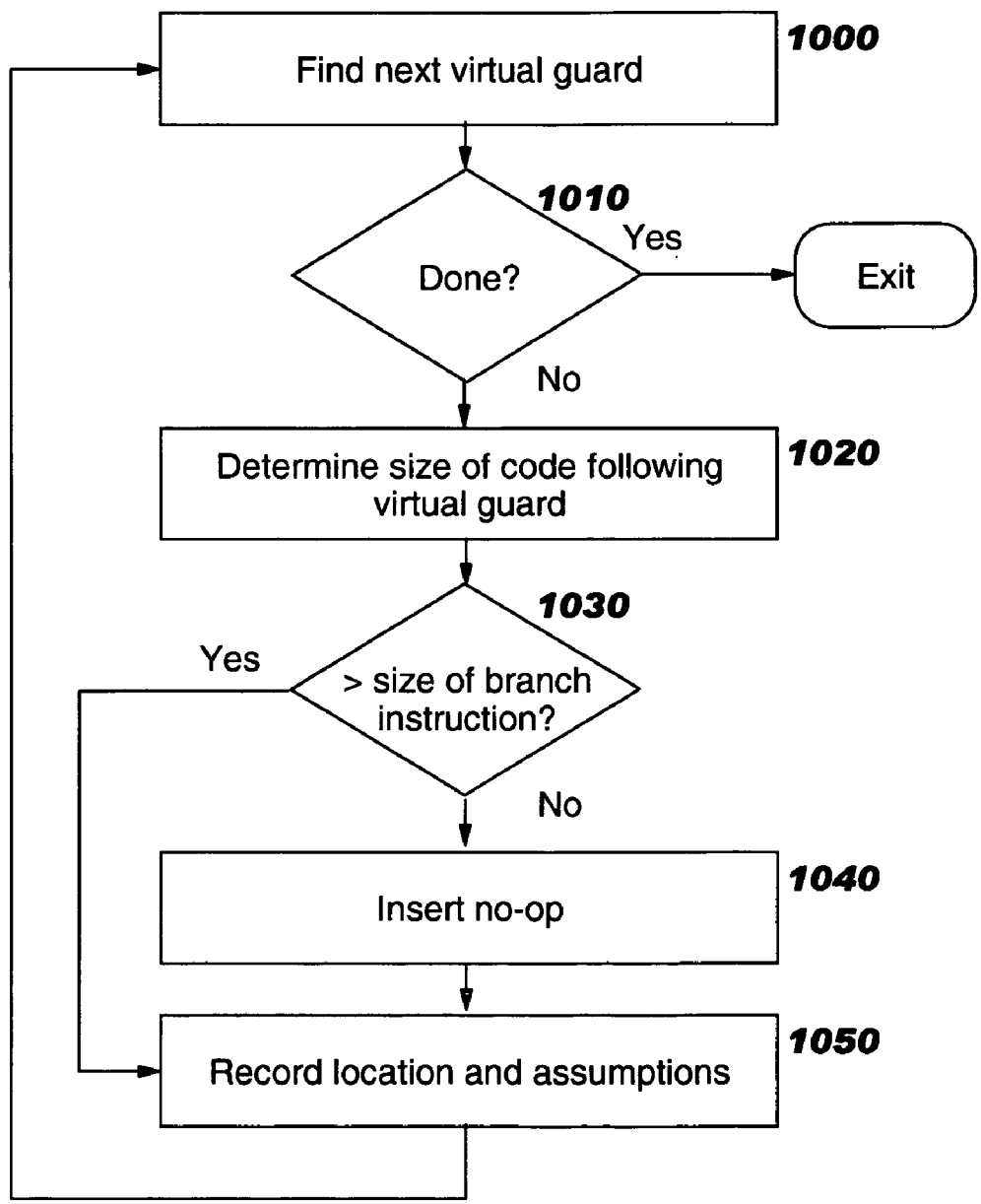
FIG. 10 provides a flowchart depicting logic that may be used to process virtual guards when generating assembly language code.

The present invention provides techniques to improve how a compiler, such as the Java JIT compiler, will organize code pertaining to data that is not constant but that is unlikely to change except in relatively infrequent situations. An example is the enabling of tracing code within an application (although this is by way of illustration and not of limitation). As discussed above, when using prior art techniques, the JIT compiler is unable to assume that the initial value of the variable being tested will remain constant, and thus cannot optimize the code that uses the variable at run time to determine an execution path.

Using prior art techniques, code for accessing and loading the variable that controls tracing, as well as the compare-and-branch instruction(s) that prevents the tracing code from executing when tracing is disabled, are executed at every potential tracing point. In an application server or middleware application, these tracing points might exist in every single method executed by an application program. And, tracing points might be provided at more than one location in a particular method, such as upon method entry and upon method exit. Accordingly, these extra instructions can have a widespread effect on the run-time performance of the application. When the number of branches is sufficient to confuse the branch-prediction hardware into making inaccurate predictions (as may occur, for example, with code that is instrumented for tracing), the application suffers even further performance degradation.

Preferred embodiments provide techniques for communicating to the compiler that a particular value is expected to be constant, although the value might change in some circumstances. A scenario pertaining to enablement of tracing will be used to describe operation of preferred embodiments, by way of illustration. Normally, tracing is disabled, but may be enabled in some situations (e.g., if a problem occurs). Techniques disclosed herein allow optimizing the generated code while still preserving the ability to execute the code corresponding to a non-typical variable setting (which, in the tracing scenario, is the "enabled" setting).

According to preferred embodiments, a class containing a variable that may have more than one value, but which will have a particular value in the typical case, is split into two classes: (1) a base class, where the value is constant and (2) a subclass thereof, where the value is a variable. In preferred embodiments, access to the value is through a getter method. When only the base class has been loaded, the JIT compiler is able to optimize code that calls the getter method almost as well as if the value were declared as a constant (i.e., as a "final" value when using the Java programming language). Whenever the value must change (such as when a user chooses to enable tracing in the example scenario), an object of the subclass is created, which forces the subclass to be loaded. Loading the subclass automatically engages functionality within the JIT run-time to "undo" the assumption that the field is constant (because the getter method has been overridden) and all subsequent executions of the originally-optimized code will then execute more slowly but correctly (regardless of the new setting of the value).

The disclosed techniques function synergistically with technologies already fundamentally present in the JIT compiler. Furthermore, the previously-described advantageous effects of block reordering are achieved without requiring any profiling information. Moreover, the disclosed techniques eliminate both the field access and the compare-and-branch instruction(s) in the "typical" scenario (e.g., the "not enabled" setting in the example tracing scenario). Eliminating these instructions has several major benefits, including: (1) the path length through the code is reduced because fewer instructions are executed; and (2) because the branch is eliminated, the branch-prediction hardware on the processor will be allocated to fewer branching instructions, which may result in fewer branch mispredictions. These benefits should result in better overall instruction fetch efficiency and better instruction cache utilization.

Techniques disclosed herein may be used with any Java Virtual Machine ("JVM") on any system platform because changes are limited, in preferred embodiments, to the code of the Java program. Furthermore, the disclosed techniques can be applied to other object-oriented languages with run-time support for dynamic class loading. Performance improvements are expected to be optimal when executing with a JIT compiler that performs guarded devirtualization and virtual guard no-ops (which are commonplace technologies in today's Java JIT compilers), as will be described in more detail herein.

Preferred embodiments will now be described in more detail with reference to FIGS. 1-13, which use a tracing enablement scenario as an example to illustrate the present invention.

Typically, the tracing facility would include a class with a simple mechanism to determine when tracing is enabled. A sample "Tracer" class 100 is provided in FIG. 1, using techniques of the prior art. As shown therein, a Boolean variable "_tracingEnabled" 110 is initialized to false, and a non-overridable "enabled( )" method 120 is defined that returns the current value of the "_tracingEnabled" variable. An instrumented method can therefore invoke this method 120 at run time to determine whether the invoking method's tracing code should be executed. Additional methods of this class include "enableTracing( )" 130, which sets the variable to true, and "disableTracing( )" 140, which sets the variable to false. Finally, this sample class 100 includes a "trace" method 150, and this method has a String parameter "s" 151 that contains tracing information to be recorded.

FIG. 2 provides a class "C" 200 containing a sample method which is named "Method" 210. This sample method has been instrumented to illustrate how an object of the Tracer class 100 might be invoked to perform run-time tracing, according to the prior art. Assuming that an object "tracer" of the Tracer class 100 has been created, the method 210 begins by performing a comparison operation 220 that invokes the "enabled( )" method 120 of this object. If the returned enablement setting is true, then the "trace" method 150 is invoked at 230 to record the name 231 of the presently-executing method, its arguments 232, and information 233 that the method has been entered. The business logic of method 200 is then performed, as represented at 240. Another comparison operation 250 is then performed by again invoking the "enabled( )" method 120 and, if the value of the returned variable is true, the "trace" method 150 is invoked again at 260 to record the name 261 of the executing method and information 262 that this method is now exiting.

The sample class 300 depicted in FIG. 3 may be generated by a Java JIT compiler as it processes the sample class 100 and method 210 of FIGS. 1 and 2, respectively. In class 300, the compiler has substituted "tracer._tracingEnabled" inline, as shown at 320 and 350, in place of the method invocations at 220 and 250.

Note that, because the "Tracer.enabled( )" method 120 is declared as "final", the JIT compiler knows that the method can never be overridden and so it is safe to directly inline the code for that method without a virtual guard, as shown in FIG. 3. (On the other hand, virtual guards are automatically generated and inserted by the compiler in other instances of code inlining. See below for a more detailed description of virtual guards.) Without the "final" keyword, the JIT compiler would still inline the code, but in a very slightly less efficient way that is not relevant for this example. The assembly language code that the JIT compiler might generate, using prior art techniques, for the sample programming language source code 300 of FIG. 3 is depicted (in an abstract form) in FIG. 4, as will now be described.

The assembly language code 400 of FIG. 4 uses the method name "Method" 405 taken from the source code 300 as well as two programmatically-generated labels 435 and 470 that represent branch point destinations. This code 400 begins by loading 410, into a register "r1", the address of the created tracer object. The value of the "_tracingEnabled" variable is then loaded 415 into a register "r2". At 420, this value is compared to zero (representing the Boolean value "false"). If these compared values are equal, the branch-on-equal instruction 425 transfers control to the branch point at 435, thereby branching around the code 430 that performs tracing; otherwise, execution will continue at 430 where, as noted in the comments, the compiler-generated code will invoke the "tracer.trace( )" method 150 before reaching the branch point 435. (Details of how the "tracer.trace( )" method is invoked from code 400 are not deemed pertinent to the present discussion, and the corresponding assembly code has therefore not been provided at reference numbers 430 and 465 in FIG. 4.)

Execution of the assembly language code 400 continues at 440, without regard to whether tracing is enabled, by performing the business logic of the compiled method. The load, compare-to-zero, and branch-on-equal processing is repeated at 445, 450, 455, 460 to determine (in this example) whether the method exit should be recorded in the trace file. If tracing is currently disabled, the branch instruction 460 will transfer control around the tracing logic invocation 465 to branch point 470; otherwise, the tracing logic invocation 465 will be executed before reaching branch point 470. The code then returns control 475 to the invoking logic.

As can be seen by this code 400, every time the sample method "Method( )" executes, it must load the value of the "_tracingEnabled" field of the tracer object, compare it to false, and if it is false, branch around the call to "tracer.trace( )". And, when tracing method entry and method exit, these operations will be performed both at the beginning of the method and at the end. (In an alternative approach, an optimization can be achieved by loading the "_tracingEnabled" field only once, but the compare and branch must be done both times.) If many such instrumented methods execute, the number of branches may exhaust the branch-prediction resources in the processor and it will be forced to apply its default prediction to these branches. Because these are forward branches, the default prediction will be "not-taken". That is, the processor will assume that the branch-around operations at 425 and 460 will not branch, and that the tracing invocations at 430 and 465 will therefore be executed. As a result, the processor will speculatively begin fetching and executing the tracing code, assuming that this tracing code should be executed, until it has retrieved the actual value of the "_tracingEnabled" field from memory (thus learning that the branch should have been taken). Most modern processors will incur a significant penalty when the value is loaded and found to be false; the speculative work will be discarded and fetching will begin anew from the point following the tracing code.

Preferred embodiments therefore use a different organization of the class performing the tracing, effectively and portably communicating to the JIT compiler the high likelihood that the value of "_tracingEnabled" will be false at run-time. In particular, the original class is split into two classes. Again using the tracing enablement scenario as an example, the single "Tracer" class 100 of FIG. 1 is therefore replaced by classes which are referred to herein, by way of example, as "Tracer" 500 and "FullTracer" 530 and which are depicted in FIGS. 5A and 5B, respectively. These replacement classes will now be discussed in more detail.

The replacement "Tracer" class 500 comprises an "enabled( )" method 510 and a "trace" method 520 (the latter of which will typically not be executed). In contrast to the original "Tracer" class 100, the "Tracer" class 500 no longer uses a "final" attribute on its "enabled( )" method 510. And, the replacement "Tracer" class 500 now specifies the "high likelihood" value of false as a constant to be returned from its "enabled( )" method, as shown at 510, which explicitly disables tracing. The compiler can therefore optimize the generated code based on this method returning a constant value. The compiler can also optimize the generated code as if only this base, minimal-function "Tracer" class 500 exists, yet whenever tracing should be activated, the "FullTracer" class 530 can be loaded and its methods can be executed. When the "FullTracer" class is loaded, the JIT run-time will automatically undo all of its optimizations that assumed only the base "Tracer" class 500 existed. This automated "undo" processing is provided by existing infrastructure of the JIT run-time that deals with dynamic class loading (as described in more detail below).

The "FullTracer" class 530 is written to subclass the replacement "Tracer" class 500, as shown at 531. This class 530 initializes the "_tracingEnabled" variable to true (540). This "unlikely" value will therefore be set only if a "FullTracer" object is created. The "FullTracer" class 530 further comprises methods that return the enablement setting (550), set tracing on (560) and off (570), and write information to a trace (580). Note that these methods are identical to methods 120-150 of the original "Tracer" class 100 (with the exception of removing the "final" attribute from the "enabled( )" method 550).

Referring now to FIG. 6, sample programming language code 600 illustrates how the JIT compiler might substitute inline the "tracer.enabled( )" method when provided with the replacement "Tracer" class 500 and the instrumented source code 200. By contrasting this sample code 600 to that provided at 300 of FIG. 3, it can be seen that the differences are found at 620 and 650. In class 600, the "tracer.enabled( )" method invoked therein is not final, and therefore a virtual guard is programmatically provided at 620 and 650 by the JIT compiler in case a class is subsequently loaded that will extend the "Tracer" class 500 and override this method 510 (for example, upon loading "FullTracer" class 530 and its overriding "enabled( )" method 550). The virtual guards will now be described in more detail.

The syntax of the virtual guards at 620 of FIG. 6 is shown in detail in FIG. 7. These virtual guards ensure that the correct code will be executed if the "tracer.enabled( )" method has been overridden. In the tracing scenario, the virtual guards thus ensure that the overriding "enabled( )" method 550 of the "FullTracer" class 530 will be executed, thereby returning a dynamically-changeable value (which may be true for the unlikely, yet possible, case that tracing is to be enabled) instead of returning a false value from executing the "enabled( )" method 510 of the base "Tracer" class 500.

Note that these virtual guard conditions are recognized by the JIT compiler and are not optimized away, even though they are logically ANDed with false in these expressions (see 621, for example), which is a Boolean simplification most JIT compilers would naturally perform. In fact, these conditions remain in place until code generation time, when they may be replaced by programmatically-generated no-op instructions. The processing of these virtual guard conditions will now be described in more detail with reference to FIGS. 8-13.

FIG. 8 provides a run-time structure 800 (shown, by way of example, as a table) illustrating information that is recorded when the JIT compiler detects a virtual guard condition. As shown therein, this information comprises the location 810 of the virtual guard and information 820 pertaining to class hierarchy assumptions on which each located virtual guard depends. In the sample table, a first entry 830 representing the virtual guard at 620 of FIG. 6 is recorded, along with a second entry 840 representing the virtual guard at 650. These entries will be discussed in more detail with reference to FIGS. 9-13. If a class is ever loaded that breaks one of the recorded assumptions (in this case, by extending "Tracer" class 500 with "FullTracer" class 530 and overriding the "enabled( )" method 510), then the location(s) associated with the assumption are patched immediately with unconditional branches to snippet locations (i.e., locations containing "snippets" of code that are to be patched into the run-time path) where the actual virtual invocations are executed.

Referring now to the assembly code 900 in FIG. 9, an intermediate step is illustrated for better understanding of the actual processing of the virtual guard locations, snippets, and patching of no-op instructions. (The JIT compiler in fact rearranges the assembly code more aggressively than shown here for run-time optimization, as will be described with reference to FIG. 11.)

By comparing assembly code 900 to assembly code 400, it can be seen that several additional labels have been generated in code 900. The "Patch1" and "Patch2" labels at 905, 920 identify locations where programmatically-generated patching of the assembly code will occur, if the assumptions underlying the virtual guards are broken. Initially, these assumptions have not been broken, and thus the locations each contain assembly code that performs an unconditional jump to transfer processing around the tracing code at labels "Merge1" 910 and "Merge2" 925. If the assumptions are broken, an unconditional branch (i.e., a jump instruction) will be programmatically inserted at the locations of the "Patch1" and "Patch2" labels, where the target of these inserted instructions is code to carry out the logic of the overriding method that causes the assumptions to be broken (as will be discussed with reference to FIG. 11).

It may, in some cases, be necessary to insert placeholders, as no-op instructions, at the point of potential insertion of the unconditional branch. For example, with reference to FIG. 9, the code at label 910, which is located between the jump instruction at 905 and its jump-to location 915, would be (at least) partially overwritten when the unconditional branch is inserted. Note also that the code between an insertion point and the jump-to location (the code at label 910, for example) will never execute again, once the guard has been patched. Because this code can be safely overwritten with the patch (in this example), it is not necessary to reserve space for insertion of the unconditional branch. However, if the size of the assembly code between the jump instruction and the jump-to location is shorter than the size required for the unconditional branch, then the no-op instruction is inserted as a placeholder to guarantee that there is space for the unconditional branch instruction if the patching is required. Comments have therefore been provided with the code at labels 905 and 920 to indicate that a no-op instruction would be generated at these locations under certain conditions. (Note also that the generated no-op, when used, must be at least as large as the largest possible unconditional branch instruction, which is primarily important for architectures with variable-sized instructions such as Intel's X86 architecture.)

The "Snippet1" code 935 and "Snippet2" code 940 are the recovery code to do full virtual invocations of the "tracer.enabled( )" method 550 when the class assumption is violated. These snippets of code remain unreachable until the class assumption associated with the virtual guard conditions is violated, after which they will be patched into the execution path (and will then execute during all subsequent executions of the method "Method" 900).

FIG. 10 illustrates logic that describes the determination of whether a no-op instruction is inserted in the generated assembly-language code. As shown therein, the next virtual guard in the processed programming language source code is located (Block 1000). If none is found (Block 1010), then processing of FIG. 10 exits. Otherwise, Block 1020 determines the size of the code following the virtual guard (where the boundary of this code is determined as code that is not reachable by any other run-time path). A test is made at Block 1030 to determine whether the size obtained at Block 1020 is greater than the size of the largest possible unconditional branch instruction for this machine architecture. If not, then Block 1040 inserts a no-op placeholder instruction in place of the virtual guard. In either case, processing then continues at Block 1050, which records this potential patch location in the run-time structure exemplified by FIG. 8, along with the assumptions that, when violated, will result in the patch being performed. The logic then repeats from Block 1000 until no more virtual guards remain to be processed.

FIG. 11 depicts assembly language code 1100 that would be generated instead of the intermediate step shown in FIG. 9, given the sample tracing code discussed herein. As can be seen by comparing FIG. 11 to FIG. 9, the JIT compiler has automatically optimized the code 1100, reorganizing the code blocks to avoid the jumps at 905 and 920. Note also that in this case, the no-op instructions are required (see 1105 and 1120). This is because there is no longer any code following these patch labels that can be overwritten, due to the code becoming unreachable, if a patch occurs (given that the code represented at 1115 and 1130 is reachable by another path, namely the labels 1110 and 1125, and must therefore continue to be executable after the patching has been performed).

The automatically-optimized code 1100 performs only the "typical" run-time operations at 1115 and then returns at 1130, and completely avoids all tracing-related processing. The "Merge1" code 1135, "Merge2" code 1140, "Snippet1" code 1145, and "Snippet2" code 1150 are all presently unreachable, yet are available for programmatic insertion in case tracing is enabled and the "FullTracer" class 530 is loaded, thereby overriding this "typical" processing 1115, 1130.

In FIG. 12, the assembly code 1200 illustrates the result of patching code 1100 when the override occurs (i.e., when the class assumptions recorded in data structure 800 have been violated). This patching is automatically performed, according to preferred embodiments, by a routine in the JIT run-time. Each of the no-op instructions 1105, 1120 is now patched with a jump to the associated code snippet. In particular, the no-op at "Patch1" 1105 is now replaced by a jump 1205 to "Snippet1" 1245, and the no-op at "Patch2" 1120 is replaced by a jump 1220 to "Snippet2" 1250. As can be seen by inspection, "Snippet1" 1245 comprises instructions 1246-1248 that obtain the current value of the "_tracingEnabled" variable and then jump 1249 to "Merge1" 1235. The code 1236 in "Merge1" 1235 uses that current value to determine whether tracing is enabled. If not, the branch instruction 1237 jumps back to the code at 1210; otherwise, the code 1238 invokes the "tracer.trace( )" code 580 and then jumps 1239 back to the code at 1210. The operation of "Snippet2" 1250 and "Merge2" 1240 is analogous to that of "Snippet1" 1245 and "Merge1" 1235.

Thus, in summary, the code 1200 first tests the current trace enablement setting using the patched-in snippet code 1245 and its associated code 1235, and may or may not perform tracing at 1238. Processing then returns to 1210, which falls through to the business logic 1215 of the method. The current enablement setting is then tested again using the patched-in snippet 1250 and its associated code 1240, and the tracing at 1243 may or may not be performed. Processing then returns to 1225, which falls through to the return 1230. As stated earlier, once the patching reflected in FIG. 12 has been performed, the optimized path shown at 1105-1130 of FIG. 11 will no longer be used. Instead, each iteration through code 1200 will begin and end (for this "entry" and "exit" instrumentation approach) by obtaining the current tracing enablement setting, testing it, performing tracing when enabled or bypassing tracing otherwise.

As previously discussed, the "FullTracer" class 530 is a class which, when loaded, will violate the assumption on which the virtual guards at 620 and 650 are based. Preferred embodiments therefore force this class 530 to be loaded whenever tracing is activated. (In non-tracing scenarios, the overriding subclass is forced to load whenever any of the "unlikely" values of the applicable glacial constant applies.) At all points in the instrumented programming language code where tracing could be activated (i.e., wherever there is an invocation to "tracer.enableTracing( )" 560), preferred embodiments ensure that the "FullTracer" class 530 is loaded so that the virtual guards (see 620 and 650 of FIG. 6) are properly patched (as shown at 1205 and 1220 of FIG. 12) so that the full virtual call to "tracer.enabled( )" (see 1247 and 1252) will be made. Note that these virtual calls are to the "FullTracer" implementation 550 of "tracer.enabled( )", which returns the value of the Boolean field "_tracingEnabled". Programming language code 1300 which may be used to force "FullTracer" 530 to be loaded is illustrated in FIG. 13, as will now be discussed.

The code 1310, 1320 is inserted before all original invocations to "tracer.enableTracing( )" 1330. This code tests 1310 to see if the current tracer object is an instance of the overriding "FullTracer" subclass 530, and if not, it forces 1320 that class to be loaded just before tracing is activated 1330. This activation 1330 then invokes the "tracer.enableTracing( )" logic at 560. At the moment that the new "FullTracer" object is created in response to 1320, the class is initialized and any virtual guards that depend on the methods declared in the Tracer class (as determined from a run-time structure such as table 800 of FIG. 8, in preferred embodiments) are invalidated by patching the no-op instructions or overwritable code (as discussed with reference to FIG. 10) with the appropriate jump instructions (as discussed with reference to FIG. 12).

As also discussed with reference to FIG. 12, once the "FullTracer" class 530 has been loaded, the fully virtual (and therefore slow) invocations 1247, 1252 of the Tracer functionality will subsequently be taken every time the "enabled( )" method is encountered, and the more streamlined processing of FIG. 11 will no longer be performed. Preferred embodiments are therefore most advantageous for variables that are initialized to values that will probably never change, but that could change under certain circumstances. Preferred embodiments are even more advantageous if performance is not as much of a concern once the value changes from its initial setting. Using techniques disclosed herein, programmers using JIT compilers can express one particular class of glacial constants (that must look like variables when using the Java programming language, because the language does not have any direct way to express the concept of a glacial constant) to the JIT compiler, which can then generate code that defaults to processing the "most likely" scenario in an optimized manner but which also retains the ability to execute code that can dynamically switch to the "unlikely" scenario.

In summary, prior to loading the "FullTracer" class, invocations of the "enabled( )" method use the base code that has been loaded (i.e., "tracer.enabled( )"). The compiler generates a virtual guard protecting the inlined code from the base class's implementation thereof. Initially-unreachable code, which the virtual guard might be patched to branch to, comprises a virtual invocation of the "enabled( )" method that will look at the class of the "tracer" object to determine what method should be invoked. When the "FullTracer" class is loaded, the "tracer" reference is set to point to an object of the "FullTracer" class, and virtual invocations of the "enabled( )" method on this reference will invoke the "FullTracer.enabled( )" method. (Note that code for this "FullTracer.enabled( )" method may be interpreted, rather than compiled.)

Programmers may leverage techniques disclosed herein by adapting source code manually and/or programmatically. As an example of a programmatic adaptation, a tool or utility may be deployed that requests the programmer to identify one or more class names and names of glacial constants used therein, along with an identification of the "typical" value for each glacial constant and an optional list of method names within the identified class or classes (where these methods are preferably the getter-type methods which return the glacial constant). In an alternative approach, the tool/utility may programmatically determine the getter-type methods by programmatically inspecting the identified classes. Once this information is known, the tool/utility can then programmatically split each class into two parts, as disclosed herein. For example, see the sample classes 500, 530 of FIGS. 5A and 5B, which were created from class 100 of FIG. 1 (as has been discussed in detail). Preferably, the tool/utility also programmatically inserts code that will dynamically trigger loading of the overriding subclass when appropriate. For example, see the sample code 1310-1320 of FIG. 13 (which has also been discussed in detail). One of skill in the art may readily construct such a tool/utility, once the teachings of the present invention are known.

As will be appreciated by one of skill in the art, embodiments of the present invention may be provided as (for example) methods, systems, and/or computer program products. The present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of processing code that uses glacial constants, comprising:
   providing, for a first code component that uses a glacial constant, two code components as replacements for the first code component, wherein:
      the first code component is written in a particular programming language;
      the two code components comprise a base code component wherein the glacial constant is used as a constant value and an overriding code component wherein the glacial constant is used as a variable value, the overriding code component overriding at least a portion of code in the base code component; and
      the base code component and the overriding code component are written in the particular programming language;
   executing the base code component as the replacement for the first code component provided that the overriding code component has not yet been dynamically loaded, causing the glacial constant to be used as the constant value;
   dynamically loading the overriding code component to replace the base code component upon programmatically detecting that a value other than the constant value is needed for the glacial constant; and
   subsequent to the dynamic loading, executing the overriding code component as the replacement for the first code component instead of the base code component, causing the glacial constant to be used thereafter as the variable value.

2. The method according to claim 1, wherein the overridden portion comprises code that, when executed, returns a current value of the glacial constant.

3. The method according to claim 1, wherein the overriding code component further comprises code that, when executed, sets the variable value of the glacial constant.

4. The method according to claim 1, wherein the dynamically loading is invoked prior to executing code to set the glacial constant to a value other than the constant value.

5. The method according to claim 1, wherein the base code component is a class in an object-oriented language and the overriding code component is a subclass of the class.

6. The method according to claim 1, wherein a compiler of the base code component generates code therefor and also generates initially-unreachable code that, when dynamically patched to become reachable, is capable of invoking code of the overriding code component.

7. The method according to claim 1, wherein a compiler of the base code component generates code therefor and also generates initially-unreachable code that, when the overriding code component is dynamically loaded, is dynamically patched to become reachable, the dynamically-patched code being capable of invoking code of the overriding code component.

8. The method according to claim 1, wherein the two code components are programmatically generated from the first code component.

9. The method according to claim 1, further comprising programmatically generating the two code components from the first code component.

10. The method according to claim 1, wherein the constant value is a most-likely run-time value for the glacial constant.

11. The method according to claim 5, wherein the dynamically loading the overriding code component occurs when an object of the subclass is created.

12. The method according to claim 5, wherein code generated to invoke code of the overriding code component is initially unreachable and is dynamically self-patching to become reachable when an object of the subclass is created.

13. The method according to claim 5, wherein:
   executing the base component comprises executing the class; and
   dynamically loading the overriding component comprises dynamically loading the subclass.

14. The method according to claim 5, wherein a virtual guard syntax that detects whether the base code component has been overridden is programmatically generated for invocations of a particular method in the class, wherein the particular method returns the constant value of the glacial constant.

15. The method according to claim 14, wherein a compiler automatically recognizes the virtual guard syntax and, responsive thereto, automatically generates code for the class and code for invoking the subclass such that the generated code for invoking the subclass is initially unreachable yet becomes dynamically reachable if one or more assumptions represented by the virtual guard syntax are violated.

16. A system for processing glacial constants in executing code, comprising:
   a computer comprising a processor and storing:
      a base code component that uses a glacial constant as a constant value;
      an overriding code component wherein the glacial constant is used as a variable value, the overriding code component adapted for overriding at least a portion of code in the base code component; and
      a compiler of the base code component which generates code therefor and which also generates code capable of invoking the overriding code component to thereafter override the portion, wherein:
         the compiler generates the code capable of invoking the overriding code component to be initially unreachable;
         the overridden portion comprises code that, when executed, returns the constant value of the glacial constant; and
         the overriding code component comprises code that, when executed, sets the variable value of the glacial constant and code that, when executed, returns the variable value of the glacial constant.

17. The system according to claim 16, further comprising a run-time loader that dynamically loads the overriding code component prior to executing code to set the glacial constant to a value other than the constant value.

18. The system according to claim 16, wherein the compiler is an optimizing compiler.

19. The system according to claim 16, wherein the compiler is a just-in-time compiler.

20. The system according to claim 16, wherein the compiler generates the code capable of invoking the overriding code component to dynamically become reachable when the overriding code component is dynamically loaded.

21. The system according to claim 16, wherein the compiler generates the code capable of invoking the overriding code component such that the invoking code is dynamically patched into a run-time path comprising the base code component and the overriding code component, the dynamic patching to occur at run time responsive to the overriding code component being dynamically loaded.

22. The system according to claim 16, further comprising a run-time loader that dynamically loads the overriding code component, responsive to executing code that references at least a portion of the overriding code component, and wherein the dynamic loading of the overriding code component causes the glacial constant to be used thereafter as the variable value instead of the constant value.

23. A computer program product for processing code that uses glacial constants, the computer program product is embodied on one or more computer-usable storage media having computer-usable program code embodied therein for:
  executing a first code component that uses a glacial constant as a constant value, provided that an overriding code component which overrides at least a portion of code in the first code component and which uses the glacial constant as a variable value has not yet been dynamically loaded;
  dynamically loading the overriding code component upon programmatically detecting that a value other than the constant value is needed for the glacial constant; and
  subsequent to the dynamic loading, executing the overriding code component instead of the overridden portion of the first code component, causing the glacial constant to be used thereafter as the variable value.

24. The computer program product according to claim 23, wherein the overridden portion comprises code that, when executed, returns the constant value of the glacial constant.

25. The computer program product according to claim 24, wherein the overriding code component further comprises code that, when executed, sets the variable value of the glacial constant.

26. The computer program product according to claim 23, comprising computer-usable program code for dynamically loading the overriding code component prior to executing code to set the glacial constant to a value other than the constant value.

27. The computer program product according to claim 23, further comprising computer-usable program code for invoking the overriding code component, wherein the computer-usable program code for invoking the overriding code component initially unreachable and is dynamically patched into a run-time path for the base code component and the overriding code component, thereby becoming reachable when the overriding code component is dynamically loaded.

28. A system for processing code containing glacial constants, comprising:
  a computer comprising a processor; and
  instructions which execute using the processor to implement functions comprising:
    executing a first code component that uses a glacial constant as a constant value, provided that an overriding code component which overrides at least a portion of code in the first code component and which uses the glacial constant as a variable value has not yet been dynamically loaded;
    dynamically loading the overriding code component upon pro grammatically detecting that a value other than the constant value is needed for the glacial constant; and
    executing the overriding code component, subsequent to the dynamic loading, instead of the overridden portion of the first code component, causing the glacial constant to be used thereafter as the variable value.

29. The system according to claim 28, wherein the overridden portion comprises code that, when executed, returns the constant value of the glacial constant.

30. The system according to claim 28, wherein the overriding code component further comprises code that, when executed, sets the variable value of the glacial constant.

31. The system according to claim 28, wherein the functions implemented by the instructions further comprise dynamically loading the overriding code component prior to executing code to set the glacial constant to a value other than the constant value.

32. The system according to claim 28, wherein the functions implemented by the instructions further comprise invoking the overriding code component, the invoking function being initially unreachable and capable of being dynamically patched into a run-time path for the base code component and the overriding code component, thereby becoming reachable when the overriding code component is dynamically loaded.

* * * * *